US006965954B2

(12) United States Patent
Okamoto

(10) Patent No.: US 6,965,954 B2
(45) Date of Patent: Nov. 15, 2005

(54) DATA PLAYING SYSTEM, TRANSMITTING AND RECEIVING APPARATUS, AND BUS CONVERSION UNIT

(75) Inventor: Koichi Okamoto, Chiba (JP)

(73) Assignee: Sony Corporation, Tokyo (JP)

( * ) Notice: Subject to any disclaimer, the term of this patent is extended or adjusted under 35 U.S.C. 154(b) by 79 days.

(21) Appl. No.: 10/338,126

(22) Filed: Jan. 7, 2003

(65) Prior Publication Data

US 2003/0153993 A1 Aug. 14, 2003

(30) Foreign Application Priority Data

Jan. 8, 2002 (JP) ............................. 2002-001835

(51) Int. Cl.[7] ............................................. G06F 13/12
(52) U.S. Cl. .................. 710/65; 710/5; 710/8; 710/30; 710/46; 710/72; 700/94
(58) Field of Search ........................... 710/62, 64, 65, 710/69, 72, 73, 315; 700/94

(56) References Cited

U.S. PATENT DOCUMENTS

| 5,938,770 | A | * | 8/1999 | Kim ........................... 713/300 |
| 5,999,899 | A | * | 12/1999 | Robinson ..................... 704/222 |
| 6,122,749 | A | * | 9/2000 | Gulick ........................ 713/324 |
| 6,131,130 | A | * | 10/2000 | Van Ryzin ....................... 710/6 |
| 6,286,063 | B1 | * | 9/2001 | Bolleman et al. ............. 710/62 |
| 6,314,479 | B1 | * | 11/2001 | Frederick et al. ............. 710/63 |
| 6,584,519 | B1 | * | 6/2003 | Russell ........................ 710/62 |
| 6,587,403 | B1 | * | 7/2003 | Keller et al. ............. 369/30.06 |
| 6,675,241 | B1 | * | 1/2004 | Hunter ........................ 710/65 |
| 2002/0087996 | A1 | * | 7/2002 | Bi et al. ........................ 725/89 |
| 2003/0045955 | A1 | * | 3/2003 | Janik ........................... 700/94 |
| 2003/0064805 | A1 | * | 4/2003 | Wells ........................... 463/39 |
| 2003/0120844 | A1 | * | 6/2003 | Hamel .......................... 710/72 |
| 2003/0153993 | A1 | * | 8/2003 | Okamoto ...................... 700/94 |

FOREIGN PATENT DOCUMENTS

| JP | 2003-202961 | * | 7/2003 | ............. G06F 3/06 |
| JP | 2003-216289 | * | 7/2003 | ............. G06F 1/32 |

OTHER PUBLICATIONS

Wi-Fi Planet, Understanding 802.11 Frame Types, Jim Geier, Aug. 15, 2002.*
Novell AppNotes, Of Ethernet Frame Types and Packet Sizes, Suzanne Mills, Posted Feb. 26, 2001.*
Electronic Design, Universal Serial Bus 2.0, Ray Weiss, Feb. 5, 2001.*
Electronic News, You've come a long way USB, Steven Larky, Steve Kolokowsky, Mark McCoy, Jul. 23, 2001.*

* cited by examiner

*Primary Examiner*—Kim Huynh
*Assistant Examiner*—Alan S. Chen
(74) *Attorney, Agent, or Firm*—Frommer Lawrence & Haug LLP; William S. Frommer; Samuel S. Lee

(57) ABSTRACT

A head unit outputs a control bus command in response to an input operation by a user. A conversion unit converts the control bus command into a USB data frame and outputs the USB data frame to a notebook personal computer. Based on the USB data frame, and notebook personal computer reads music data stored in a hard disk drive, and outputs the music data to the head unit via the conversion unit. If the music data is compressed, the music data is decoded at the notebook personal computer. Thus, a dedicated decoding LSI need not be provided in the head unit.

11 Claims, 7 Drawing Sheets

DATA PLAYING SYSTEM, TRANSMITTING AND RECEIVING APPARATUS, AND BUS CONVERSION UNIT

BACKGROUND OF THE INVENTION

1. Field of the Invention

The present invention relates to a data playing system for playing, for example, data recorded in a storage unit of a computer by a playing apparatus such as an audio apparatus, a transmitting and receiving apparatus used in such a data playing system, and a bus conversion unit.

2. Description of the Related Art

As is known, in order to play music data by an audio apparatus, a recording medium (storage medium) having music data recorded thereon, such as a CD-R (CD recordable), a CD-RW (CR rewritable), an MD (mini disc), or a memory card, is set in the audio apparatus, and music data is played therefrom. Recently, music data recorded in such a recording medium is often in the form of compressed audio data. Thus, an audio apparatus usually includes a decoding LSI (large scale integrated circuit) for decoding compressed audio data.

In order to play music data in various places, audio apparatuses in accordance with various situations of listening to music, for example, for household use, for automobile use, and for portable use, are needed. In order to play compressed audio data by each of the apparatuses, a decoding LSI is needed in each of the apparatuses. Consequently, total cost for the user is high, and problems with regard to efficiency and environmental load exist. These problems become even more severe when new functions are added to audio apparatuses and new LSI devices are mounted on audio apparatuses.

Furthermore, in the case of compressed audio data, if a user stores digital data in a personal computer (PC), in order to actually listen to music, the user writes the data in a storage medium as described above, and listens to music from the storage medium by an automobile apparatus or a portable apparatus. In that case, various storage media are needed in accordance with various situations of listening to music. This necessitates the work of writing data to storage media, which in itself is not a purpose for the user.

SUMMARY OF THE INVENTION

The present invention has been made in view of the technical problems described above, and it is an object of the present invention to provide a data playing system and the like that allows a user to play data in various situations without needing a large number of internal LSIs and storage media, serving to reduce cost for the user, and to improve usability by eliminating the need of writing data to storage media.

The present invention, in one aspect thereof, provides a data playing system including an operation unit for outputting a first control signal corresponding to an input operation by a user; a conversion unit for converting the first control signal output from the operation unit into a second control signal compliant with an interface standard that is different from an interface standard for the first control signal, and for outputting the second control signal; a data storage unit for reading and outputting data stored therein, based on the second control signal input from the conversion unit; and a playing unit for playing the data output from the data storage unit.

Accordingly, data in the data storage unit can be played even if the operation unit and the playing unit belong to an apparatus that is different from an apparatus to which the data storage unit belongs. Thus, for example, data stored in a personal computer or the like can be played by a car audio apparatus. In that case, by decoding compressed audio data at the personal computer, an LSI for decoding the compressed audio data is not needed in the playing unit.

The data may be, for example, audio data, video data, or the like.

Preferably, the data storage unit allows the data to be read by a computer, and the second control signal is contained in a data frame that can be read by the computer. Accordingly, data can be played by controlling the computer from the operation unit. In this case, the data storage unit may be included in the computer or connected externally to the computer.

Also preferably, the data storage unit outputs the data in the form of a data signal in a data frame format that is the same as a data frame format of the second control signal. This allows the control signal and the data signal to be transmitted and received via the same input/output interface.

The present invention, in another aspect thereof, provides a data playing system including a computer apparatus for reading and outputting recorded data; and a playing apparatus connected to the computer apparatus; wherein the playing apparatus includes an operation unit that allows operation by a user, the playing apparatus outputs a control signal corresponding to an input operation at the operation unit to the computer apparatus, the computer apparatus reads and outputs the recorded data based on the control signal input to the computer apparatus, the computer apparatus transmits the recorded data to the playing apparatus, and the playing apparatus plays the recorded data output from the computer apparatus.

The computer apparatus may include a unit for storing the recorded data, or the recorded data may be stored in an external storage unit. The computer apparatus and the playing apparatus may be connected, for example, by wireless.

The data playing system may further include a converter for writing the control signal output from the playing apparatus in a data portion of a packet that can be read by the computer apparatus, and for outputting the packet to the computer apparatus, wherein the computer apparatus reads the control signal from the packet input from the converter. This allows the computer apparatus to readily receive the control signal output from the playing apparatus.

The computer apparatus may output the recorded data to the converter in the form of a digital signal, and the converter converts the digital signal into an analog signal and outputs the analog signal to the playing apparatus. This allows an interface between the converter and the computer apparatus to be shared for transmission of the control signal and transmission of the recorded data.

Preferably, the converter stores predetermined setting data set by the computer apparatus, and outputs the setting data to the playing apparatus if a predetermined command is included in the control signal. Accordingly, a response request from the playing apparatus with a severe time constraint can be quickly responded to by returning the setting data.

The present invention, in another aspect thereof, provides a data playing system including a computer apparatus that allows playing data to be stored therein; a playing apparatus for playing the playing data output from the computer apparatus; a first bus connected to the computer apparatus, for allowing input and output of data to and from the computer apparatus; a second bus for outputting a control signal from the playing apparatus based on an input operation at the playing apparatus; a third bus for inputting the playing data to the playing apparatus; a control signal converter connected between the first bus and the second bus, for converting the control signal output via the second bus into a signal that can be read by the computer apparatus and for transmitting the signal to the first bus; and a playing data converter connected between the first bus and the third bus, for converting the playing data output via the first bus into data that can be read by the playing apparatus, and for transmitting the data to the third bus.

Accordingly, a control signal based on an input operation at the playing apparatus can be output therefrom to the computer apparatus via the second bus, the control signal converter, and the first bus, and playing data output from the computer apparatus can be output to the playing apparatus via the first bus, the playing data converter, and the third bus.

The present invention, in another aspect thereof, provides a transmitting and receiving apparatus for transmitting and receiving data between a computer and a playing apparatus, including a playing-apparatus-side receiving unit for receiving a data command output from the playing apparatus; a first converter for converting the data command received by the playing-apparatus-side receiving unit into a data frame that can be read by the computer; and a computer-side transmitting unit for transmitting the data frame obtained by the conversion by the first converter to the computer.

Accordingly, the computer can be controlled using a data command output from the playing apparatus.

The transmitting and receiving apparatus may further include a computer-side receiving unit for receiving the data frame output from the computer; a second converter for converting at least part of the data frame received by the computer-side receiving unit into a data command that can be read by the playing apparatus; and a playing-apparatus-side transmitting unit for transmitting the data command obtained by the conversion by the second converter to the playing apparatus.

This allows the playing apparatus to operate based on control data on the computer side.

The transmitting and receiving apparatus may further include a setting value recording unit for recording a setting value set by the computer; and a setting value transmitting unit for transmitting the setting value to the playing apparatus via the playing-apparatus-side transmitting unit in response to a request from the playing apparatus. This allows a quick response to a request from the playing apparatus with a time constraint.

The present invention, in another aspect thereof, provides a bus conversion unit including a hub that can be connected to a first bus compliant with a predetermined standard; a digital-to-analog converter connected to the hub, for converting a digital signal input from the first bus to the hub into an analog signal; and a bus converter that is connected to the hub and that can be connected to a second bus-compliant with a standard that is different from the standard for the first bus; wherein the bus converter converts a signal in a predetermined data frame format input from the first bus to the hub into a command in a predetermined format, and converts a signal input from the second bus as a command in the predetermined format into a signal in the predetermined data frame format, outputting the signal in the predetermined data frame format to the first bus.

Accordingly, by connecting the first bus to the personal-computer side and the second bus to the playing-apparatus side, digital music data input from the personal computer via the first bus is converted into analog data. Furthermore, if control data is input from the personal computer via the first bus, the control data is converted into a command in the predetermined format, and the command is output to the playing apparatus via the second bus. If a command is input from the playing apparatus via the second bus, the command is converted into a signal in a predetermined data frame format, and the signal is output to the personal computer.

Preferably, for example, the first bus is a USB (Universal Serial Bus) cable and the predetermined data frame format is a USB data frame format.

However, without limitation thereto, other types of bus, such as an IEEE 1394 bus, may be used.

Also preferably, the second bus is a control bus of an audio apparatus, and the predetermined command is transmitted via the control bus in the audio apparatus.

Also preferably, the bus converter is connected to the audio apparatus via the control bus, and the bus converter outputs, on its own, a response command for polling to the audio apparatus in response to a request from the audio apparatus.

DESCRIPTION OF THE PREFERRED EMBODIMENT

A preferred embodiment of the present invention will now be described in detail with reference to the accompanying drawings.

Figure 1:
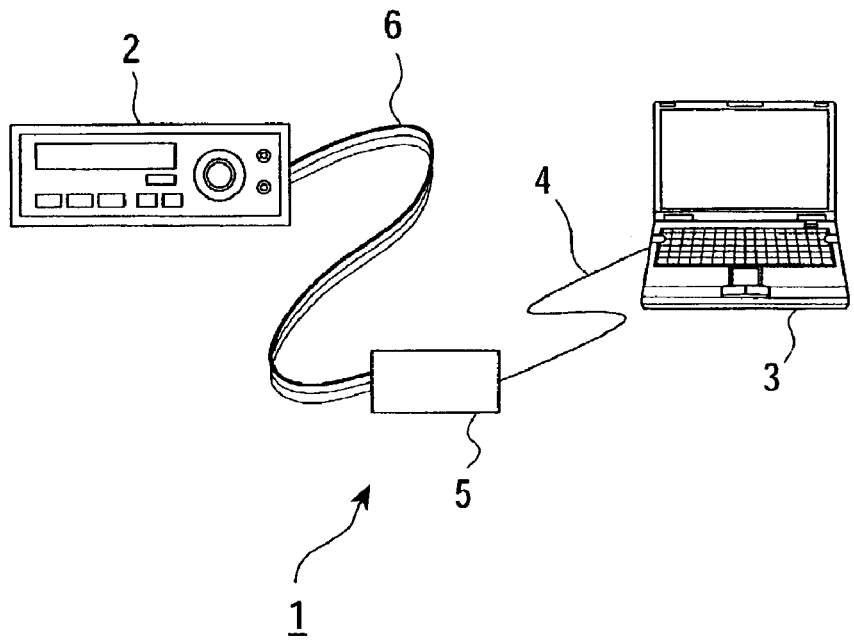
FIG. 1 is an external view showing the overall configuration of an audio system according to an embodiment of the present invention.

FIG. 1 is a diagram showing the overall configuration of an audio system (data playing system) according to an embodiment of the present invention. Referring to FIG. 1, in an audio system 1, a head unit 2 of a car audio apparatus (playing apparatus) mounted on an automobile is connected to a notebook personal computer (PC) (computer or computer apparatus) 3 via a USB (Universal Serial Bus) cable (first bus) 4, a conversion unit (converter, transmitting and receiving apparatus, or bus conversion unit) 5, and audio cables 6. The audio system 1 plays, by the car audio apparatus, music data in the form of compressed audio data recorded on a hard disk drive (data storage means) included in the notebook PC 3.

Figure 2:
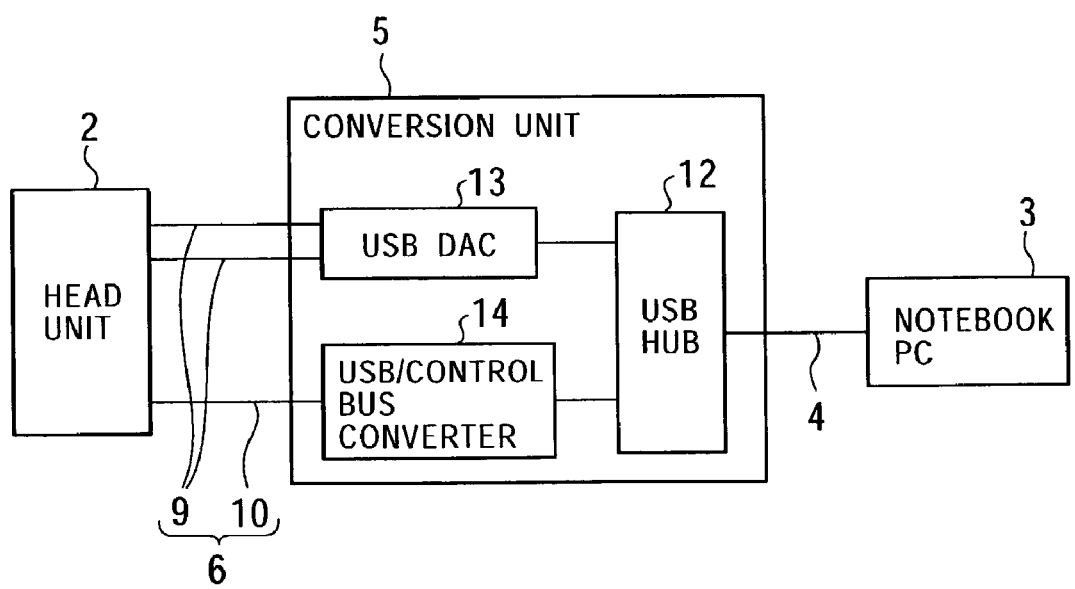
FIG. 2 is a block diagram of the audio system shown in FIG. 1.

FIG. 2 is a block diagram of the audio system 1. Referring to FIG. 2, the audio cables 6 include two lines of audio pin cable (third bus) 9 that allows transmission of analog music data, and a control bus (second bus) 10 for exchanging data other than music data between the head unit 2 and the conversion unit 5.

The conversion unit 5 includes a USB hub 12, a USB and DA converter (playing data converter) 13, and a USB/control bus converter (conversion means, bus converter, or control signal converter) 14. The USB hub 12 is connected to one end of the USB cable 4, and also to each of the USB and DA converter 13 and the USB/control bus converter 14. The USB and DA converter 13 converts music data in the PCM (pulse code modulation) format transmitted from the notebook PC 3 via the USB cable 4 and the USB hub 12 into an analog signal, and outputs the analog signal to the audio pin cables 9. The USB/control bus converter 14 recognizes data other than music data, transmitted from the notebook PC 3, converts the data into a control bus command that can be transmitted via the control bus 10, and outputs the control bus command to the control bus 10. Also, when a predetermined command has been transmitted from the head unit 2 via the control bus 10, the USB/control bus converter 14 outputs the predetermined command to the USB cable 4 in the form of a USB data frame. Furthermore, the USB/control bus converter 14 responds on its own to a predetermined command transmitted from the head unit 2 via the control bus 10.

Figure 3:
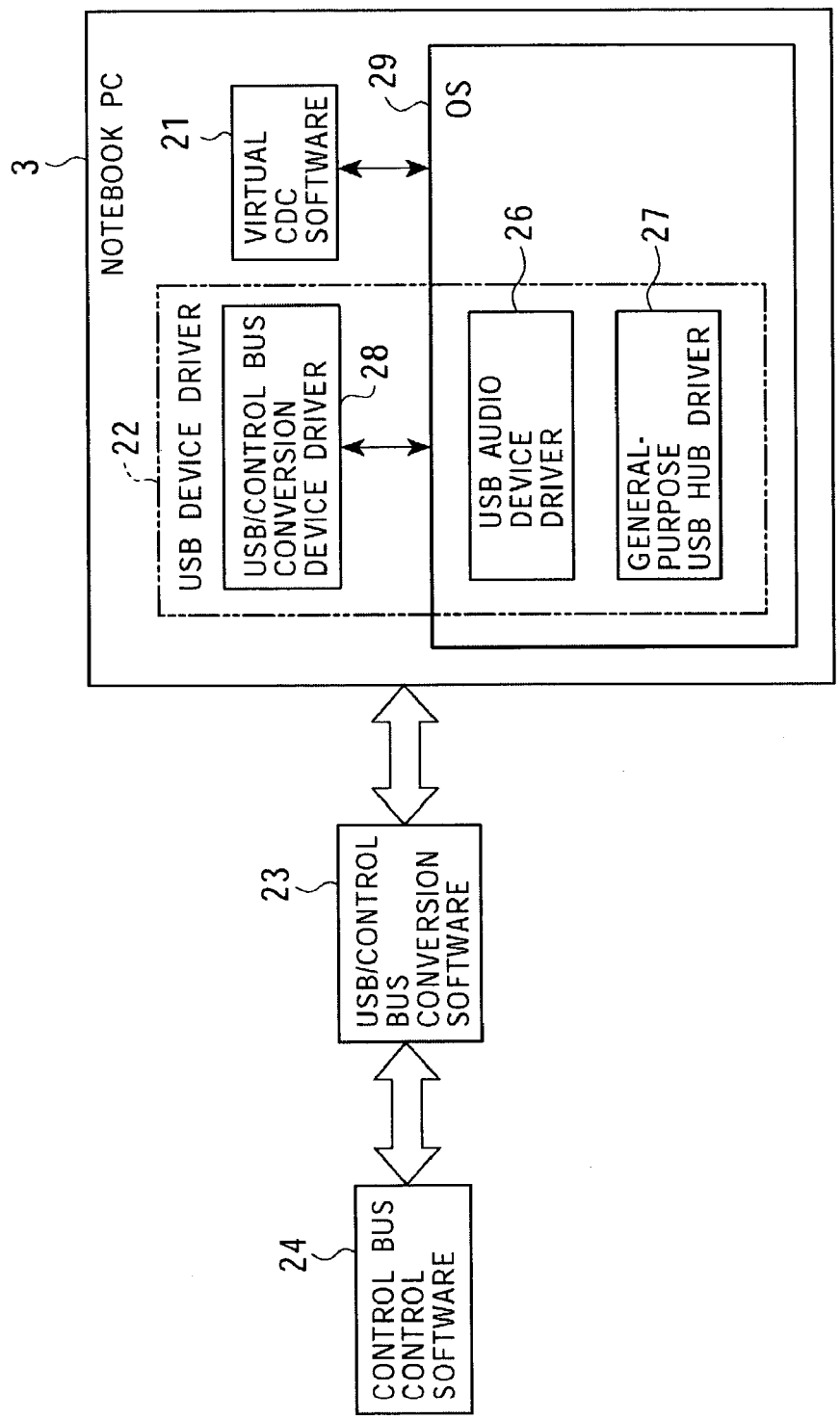
FIG. 3 is a software block diagram of the audio system shown in FIG. 1.

FIG. 3 is a block diagram showing the configuration of software for controlling the audio system 1.

Referring to FIG. 3, the audio system 1 is controlled by virtual CDC (compact disc changer) software 21, a USB device driver 22, USB/control bus conversion software 23, and control bus control software 24. The virtual CDC software 21 is deployed in a program area of a CPU of the notebook PC 3, and it handles music data recorded on a hard disk effectively as music data of a plurality of CDs in an ordinary CD changer containing the CDs. More specifically, the virtual CDC software 21 recognizes a plurality of tracks of music data recorded on the hard disk drive as a single virtual CD or a plurality of virtual CDs, and reads and decodes the music data of the virtual CDs. Furthermore, the virtual CDC software 21 changes status of the virtual CDC (e.g., reads a track next to a track currently being played from the virtual CDs, or outputs display data associated with music data that has been read) according to a control signal output from the head unit 2 via the control bus 10. Furthermore, the virtual CDC software 21 displays a screen, called a CD magazine, for adding or deleting virtual CDs or registering or deleting music data in virtual CDs, and detects input operations by a user on the screen.

The USB device driver 22 includes a USB audio device driver 26 for controlling the USB and DA converter 13, a general-purpose USB hub driver 27 for controlling the USB hub 12, and a USB/control bus conversion device driver 28 for controlling the USB/control bus converter 14. For example, the USB audio device driver 26 and the general-purpose USB hub driver 27 are incorporated in an operating system (OS) 29 for system management of the notebook PC 3, and the USB/control bus conversion device driver 28 is designed independently.

The USB/control bus conversion software 23 is firmware recorded in the USB/control bus converter 14 of the conversion unit 5. The USB/control bus conversion software 23 is regarded as a USB device by the notebook PC 3, and it is regarded as a CD changer by the head unit 2.

The control bus control software 24 is existing software incorporated in the head unit 2, and it controls a CD changer via the control bus 10.

Next, operations of the audio system 1 will be described.

Main operations of the audio system 1 include:

1) initial link operation for starting communication when the notebook PC 3 is initially connected to the head unit 2 via the conversion unit 5;

2) time polling operation for maintaining connection between the head unit 2 and the conversion unit 5; and 3) user-initiated operation for transmitting data from the notebook PC 3 to the head unit 2 according to an operation of the head unit 2 by a user.

These operations will be described below.

1) Initial Link Operation

Figure 4:
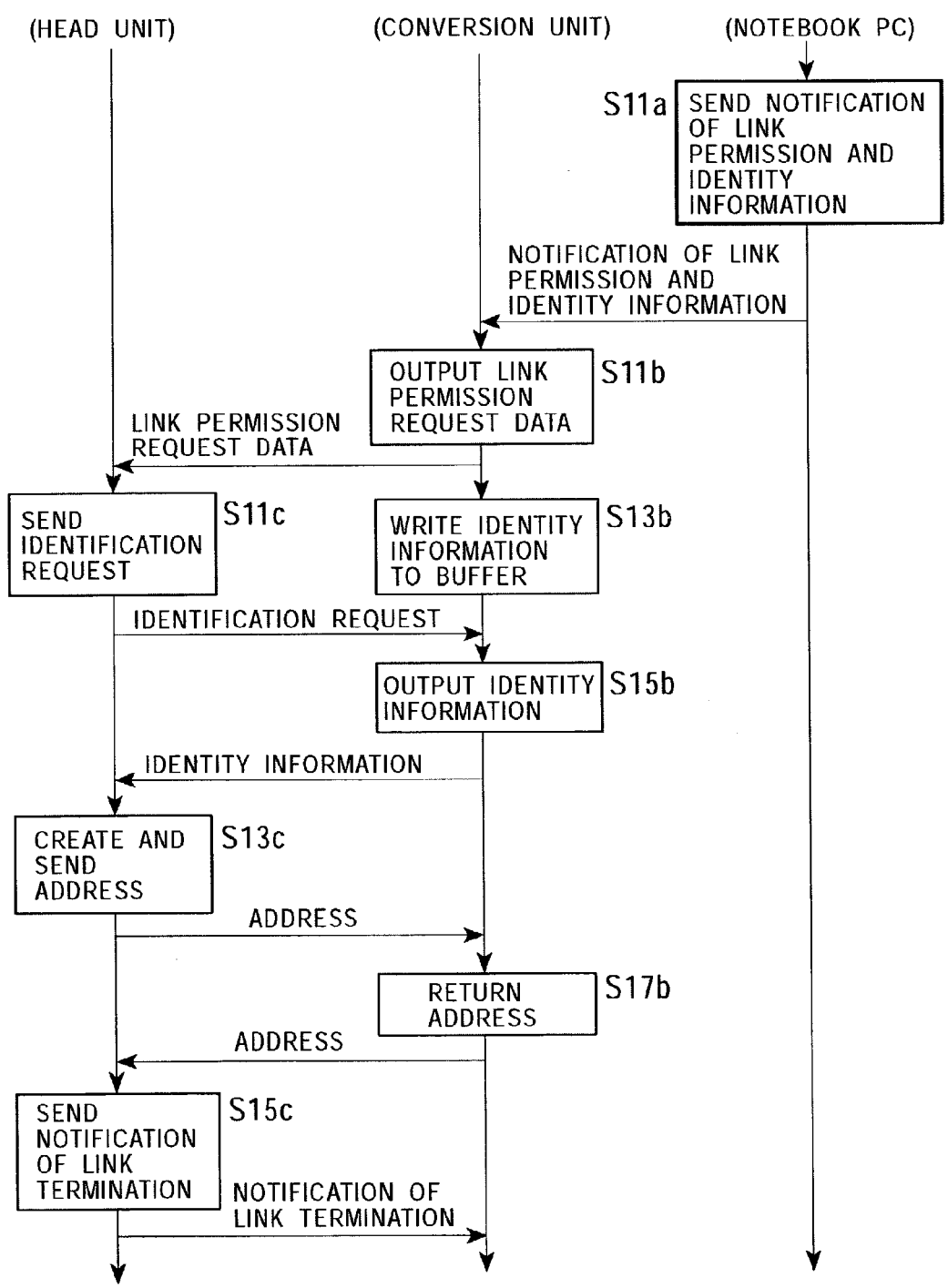
FIG. 4 is a flowchart of an initial link operation in the audio system shown in FIGS. 1 to 3.

FIG. 4 is a flowchart showing an example of the initial link operation. The initial link operation is executed with the notebook PC 3 and the head unit 2 both powered on. In this example, the OS 29, the virtual CDC software 21, and the USB device driver 22 are activated in the notebook PC 3, and the control bus control software 24 is activated in the head unit 2.

Referring to FIG. 1, when the notebook PC 3 is connected via the USB cable 4 to the conversion unit 5 connected to the head unit 2, power is supplied from the notebook PC 3 to the conversion unit 5 via the USB cable 4, and the USB/control bus conversion software 23 is activated in the conversion unit 5. In this state, referring to FIG. 4, the OS 29 of the notebook PC 3 transmits a notification of link permission to the conversion unit 5 (step S11a). At this time, identity information of the virtual CDC software 21 as a CDC is also transmitted from the virtual CDC software 21 to the conversion unit 5. In this example, the identity information indicates a CDC that accommodates ten CDs.

Upon receiving the notification of link permission and the identity information, in the conversion unit 5, the USB/control bus conversion software 23 outputs link permission request data to the head unit 2 via the control bus 10. (step S11b), and writes the identity information to a buffer (not shown) (step S13b).

The head unit 2 transmits, via the control bus 10, an identification request for identifying an apparatus that has transmitted the link permission request (step S11c). In response to the identification request, the conversion unit 5 outputs the identity information of the CDC (virtual CDC) based on the information written to the buffer (step S15b). Accordingly, the head unit 2 recognizes that the CDC is connected via the control bus 10. The head unit 2 then creates an address to be assigned to the CDC (virtual CDC), and transmits the address to the conversion unit 5 via the control bus 10 (step S13c). In the conversion unit 5, the USB/control bus conversion software 23 returns the assigned address to the head unit 2 (step S17b). Then, the control bus control software 24 of the head unit 2 transmits a notification of link termination to the conversion unit 5 (step S15c). This completes the initial link operation.

2) Time Polling Operation

Next, the time polling operation, executed for maintaining connection between the head unit 2 and the conversion unit 5 after the initial link operation, will be described.

Figure 5:
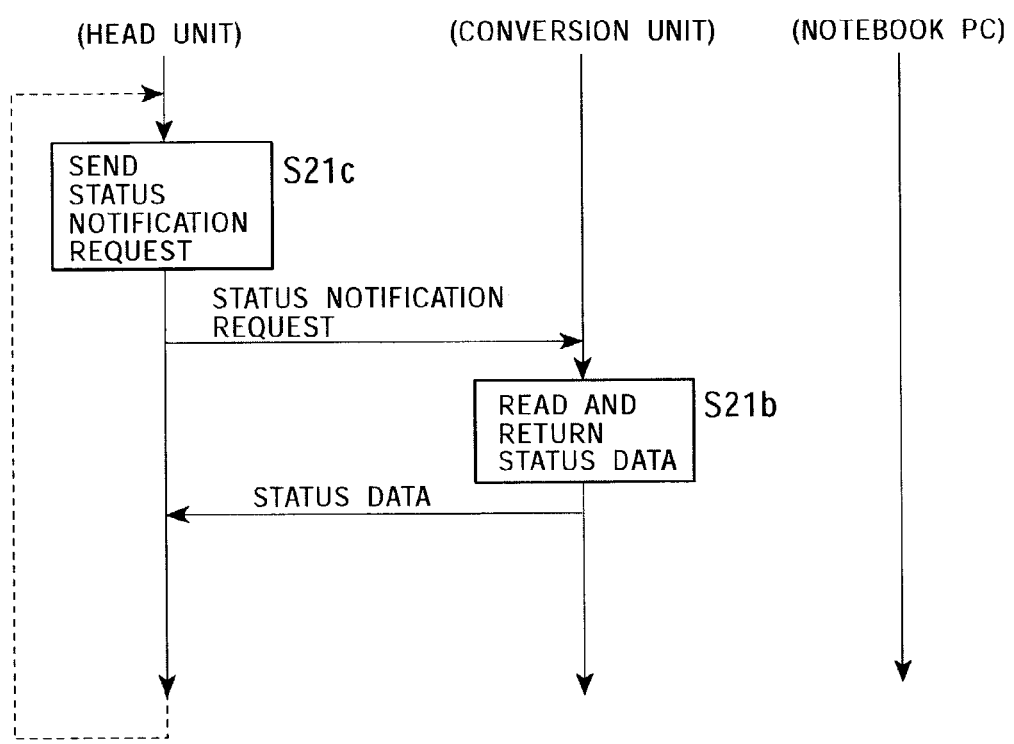
FIG. 5 is a flowchart of a time polling operation.

FIG. 5 is a flowchart of the time polling operation.

After the initial link operation has been executed, the control bus control software 24 of the head unit 2 transmits a status notification request to the conversion unit 5 (step S21c). In response to the status notification request, in the conversion unit 5, the USB/control bus conversion software 23 reads status data set by the notebook PC 3 and written to a buffer, and returns the status data to the head unit 2 (step S21b). After that, the control bus control software 24 of the conversion unit 5 repeats transmission of a status notification request (step S21c) at an interval of 600 ms.

If status data fails is not returned three times consecutively, the control bus control software 24 disconnects the linked device from the system. As described above, in response to inquiries from the head unit 2, the USB/control bus conversion software 23 of the conversion unit 5 returns status data written to the buffer, whereby connection between the head unit 2 and the conversion unit 5 is maintained. Thus, status need not be inquired to the notebook PC 3, so that time required for returning status data is reduced. The processing will be described later in detail.

3) User-initiated Operation

Next, the user-initiated operation, executed for transmitting data from the notebook PC 3 to the head unit 2 in response to an operation of the head unit 2 by a user, will be described.

Figure 6:
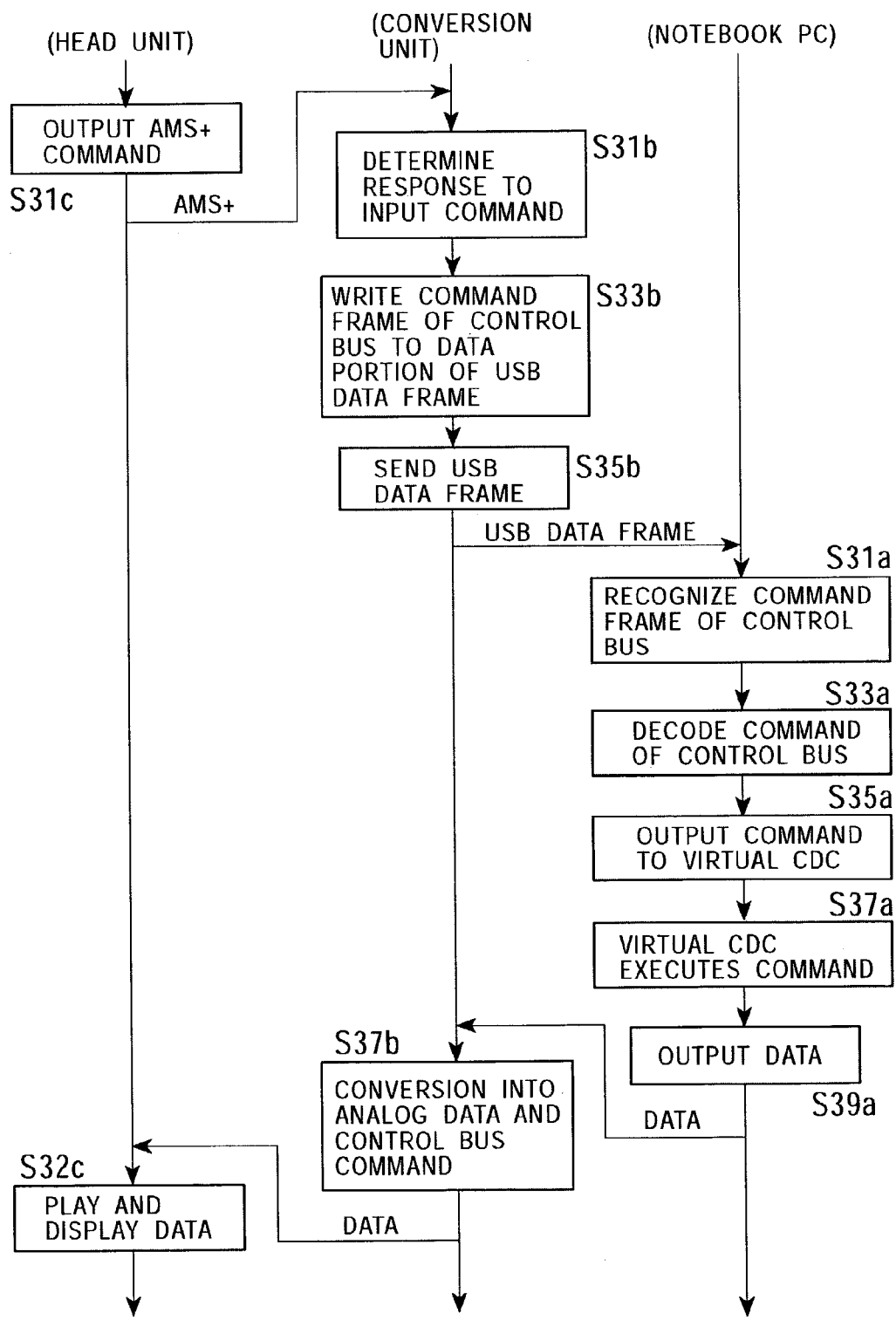
FIG. 6 is a flowchart of a user-initiated operation that is executed in response to an input operation by a user at a head unit.

FIG. 6 is a flowchart showing an example of the user-initiated operation.

While the connection between the head unit 2 and the conversion unit 5 is maintained by continually executing the time polling operation described above, if a user presses, for example, an AMS (auto music search) button of the head unit 2, the control bus control software 24 detects the user operation, and outputs a predetermined command (AMS+command) to the USB/control bus converter 14 via the control bus 10 (step S31c). In the USB/control bus converter 14, the USB/control bus conversion software 23 determines whether the input command is a command to be responded by the USB/control bus converter 14 (step S31b). If the input command is determined as a command not to be responded by the USB/control bus converter 14, the USB/control bus conversion software 23 writes the command frame of the control bus 10 to a data portion of a USB data frame (step S33b). Then, the USB/control bus converter 14 transmits the USB command frame containing the command frame of the control bus 10 to the notebook PC 3 (step S35b). In the notebook PC 3, the USB/control bus conversion device driver 28 recognizes that the data portion of the USB data frame is a command frame of the control bus 10 (step S31a), and decodes the command of the control bus 10 (step S33a).

The USB/control bus conversion device driver 28 outputs the decoded control bus command to the virtual CDC software 21 (step S35a), and the virtual CDC software 21 executes the control bus command (step S37a). In this example, since the control bus command is an AMS+command, the virtual CDC software 21 jumps to a track next to a track currently being played, and plays music data of the next track. More specifically, music data constituted of compressed audio data of the next track is decoded by the virtual CDC software 21 and converted into PCM (pulse code modulation) data in USB data frames, and the PCM data is output to the conversion unit 5 via the USB cable 4 (step S39a). The general-purpose USB hub driver 27 and the USB audio device driver 26 of the notebook PC 3 control the USB hub 12 and the USB and DA converter 13 so that the PCM data output from the notebook PC 3 is converted into analog data in the USB and DA converter 13 (step S37b). Then, the analog data is transmitted to the head unit 2 via the audio cable 6, and played by the car audio apparatus (step S32c). Furthermore, in this example, the virtual CDC software 21 outputs data including track data and title data to the USB/control bus conversion device driver 28. The data constitutes part of a USB data frame, and the data is output to the USB/control bus converter 14 by the USB/control bus conversion device driver 28 (step S39a). The USB data frame is converted into a control bus command in the USB/control bus converter 14 (step S37b), and the control bus command is output to the head unit 2. In the head unit 2, the control bus control software 24 displays the track data, title data, etc. on a display unit based on the control bus command (step S32c).

Next, the USB/control bus conversion software 23 for implementing the operations of the audio system 1 described above will be described in detail.

Figure 7:
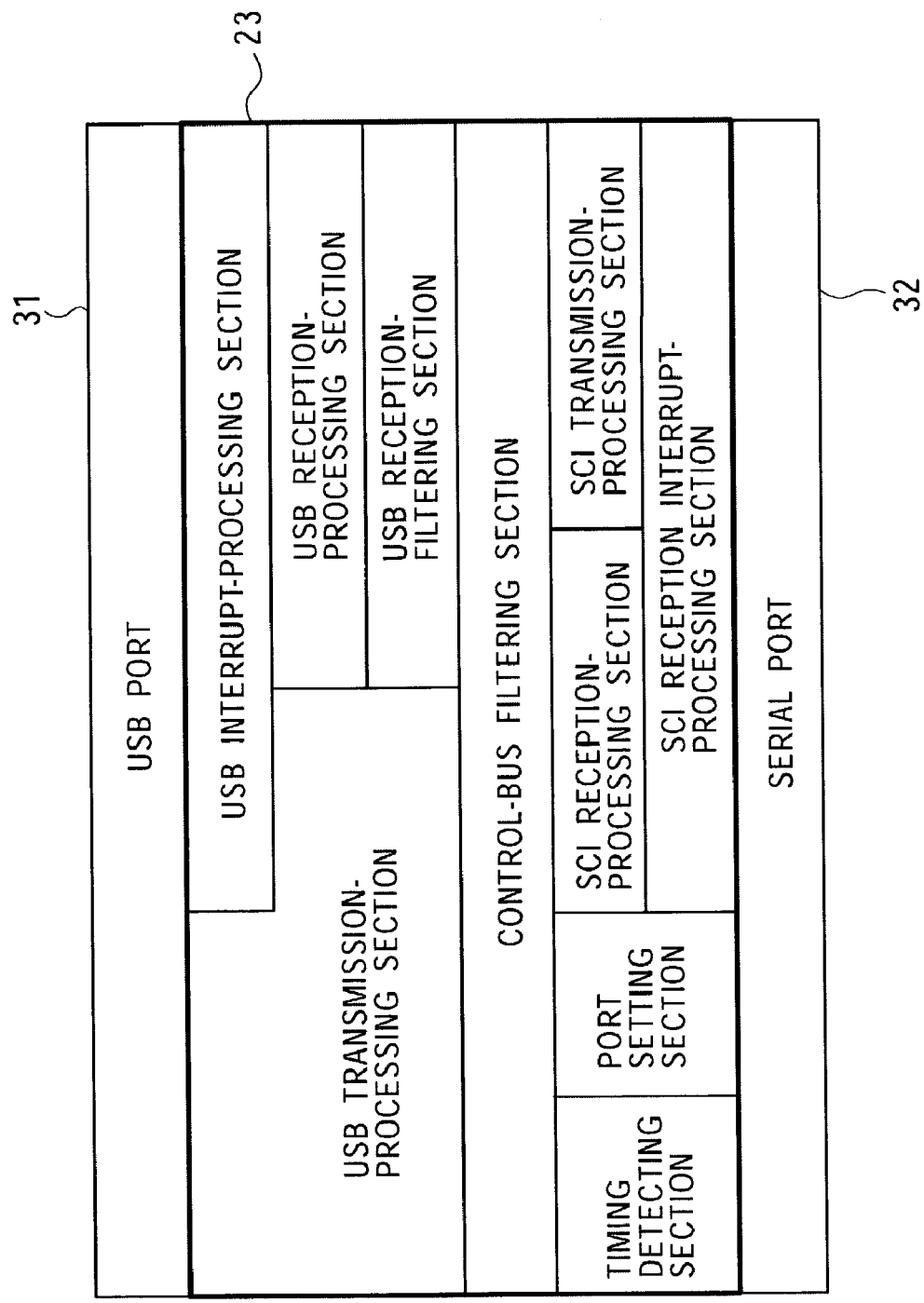
FIG. 7 is a layer configuration diagram of USB/control bus conversion software shown in FIG. 3.

FIG. 7 is a software block diagram showing a layer configuration of the USB/control bus conversion software 23.

Referring to FIG. 7, in order to implement the operations of the audio system 1 described above, the USB/control bus conversion software 23 allows the USB/control bus converter 14 to execute a function of exchanging data between a USB port 31 connected to the USB hub 12 and a serial port 32 connected to the control bus 10, and a function of outputting from the serial port 32 a response to a command input from the serial port 32.

Each of the blocks in the layer configuration shown in FIG. 7 represents a function of the USB/control bus conversion software 23, and blocks in adjacent layers have interfaces for exchanging data with each other.

Figure 8:
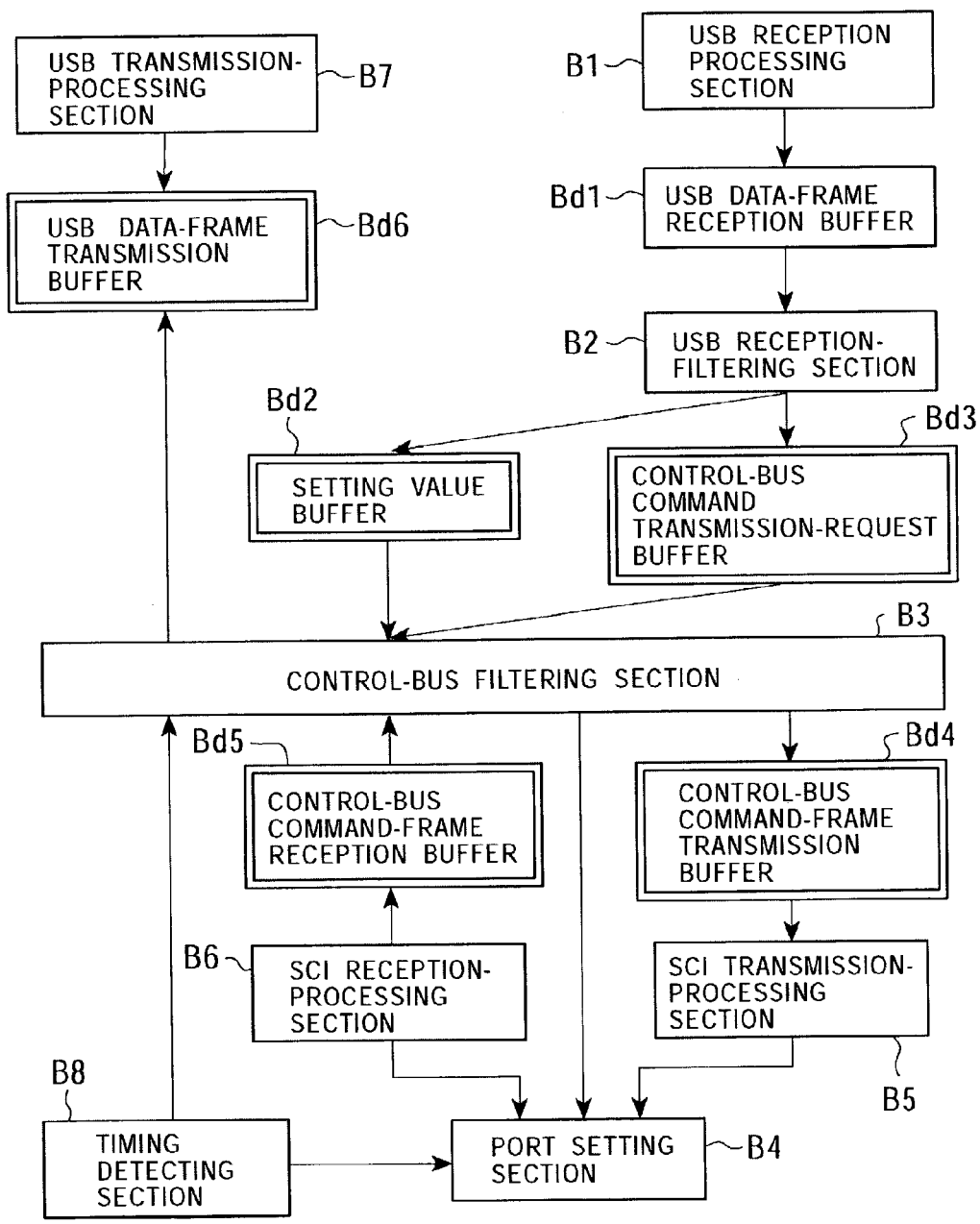
FIG. 8 is a functional block diagram of the USB/control bus conversion software shown in FIG. 3.

FIG. 8 shows flow of data in the USB/control bus conversion software 23.

In FIG. 8, rectangular blocks indicated by singlets represent processing sections corresponding to the software layer configuration described above, and rectangular blocks indicated by doublets represent buffers for temporarily storing data transferred between the blocks in the course of processing in the blocks indicated by singlets.

First, a flow of data in the USB/control bus software 23 in transmitting a USB data frame from the notebook PC 3 will be described with reference to FIG. 8.

A USB data frame transmitted from the notebook PC 3 via the USB cable 4 is received in a USB reception-processing section (computer-side processing unit) B1 of the software. Each USB data frame received by the USB reception-processing section B1 is stored in a USB data-frame reception buffer Bd1.

The USB data frame written to the USB data-frame reception buffer Bd1 is read by a USB reception-filtering section B2. More specifically, the USB reception-filtering section B2 reads each USB data frame present in the USB data-frame reception buffer Bd1, if any, and divides the USB data frame into meaningful data units. (Each of the data units will hereinafter be referred to as USB command status.)

If the USB command status is a command to be transmitted to the control bus 10 (hereinafter referred to as control bus command status), the USB reception-filtering section B2 records the command in a control-bus command transmission-request buffer Bd3. If the USB command status includes status data that is to be immediately responded by the conversion unit 5 in response to a request from the head unit 2, such as status data used in the time polling operation described earlier, the USB reception-filtering section B2 records the status data in a setting value buffer (setting value recording unit) Bd2. The status data recorded in the setting value buffer Bd2 is read by a control-bus filtering section (first converter, second converter, or setting value transmitting unit) B3 in order to immediately respond to a request from the head unit 2, as will be described later.

If data is present in the control-bus command transmission-request buffer Bd3, the control-bus filtering section B3 obtains the data, and converts the data into a control bus command frame, recording the control bus command frame in a control-bus command-frame transmission buffer Bd4. Furthermore, the control bus filtering section B3 outputs a control bus command transmission request to a port setting section B4. Upon receiving the control bus command transmission request, the port setting section B4 enables serial transmission via the serial port 32.

While transmission via the serial port 32 is enabled, an SCT (serial communication interface) transmission-processing section (playing-apparatus-side transmitting unit) B5 reads data from the control-bus command-frame transmission buffer Bd4, and transmits the data byte by byte from the serial port 32.

In this manner, a USB data frame output from the notebook PC via the USB cable 4 can be output to the control bus 10.

Next, processing by the USB/control bus conversion software 23 for outputting a command input from the control bus 10 to the notebook PC 3 in the form of a USB data frame will be described with reference to FIG. 8.

When serial data is input from the control bus 10, a SCI reception-processing section (playing-apparatus-side reception unit) B6 controls the port setting section B4 to enable reception via the serial port 32, whereby the serial data output from the control bus 10 is received. The SCI reception processing section B6 creates a command frame based on the received data, and records the command frame in a control-bus command-frame reception buffer Bd5.

If a control bus command frame is present in the control-bus command-frame reception buffer Bd5, the control bus filtering section B3 obtains the control bus command frame and analyzes the command. If the command determined by the analysis as a command to be transmitted to the notebook PC 3, the control-bus filtering section B3 creates a USB transmission data frame including the control bus command frame as data, and writes the USB transmission data frame to a USB data-frame transmission buffer Bd6. If any data is present in the USB data-frame transmission buffer Bd6, a USB transmission-processing section (computer-side transmitting unit) B7 of the USB/control bus conversion software 23 sets the data in a memory (not shown) allocated to a USB controller, whereby the USB transmission data frame is transferred from the memory to the notebook PC 3. After the data has been transferred, the USB transmission-processing section B7 deletes the data stored in the memory.

In this manner, a command input from the control bus 10 can be output to the notebook PC 3 in the form of a USB data frame.

Next, processing executed by the USB/control bus conversion software 23 for responding, via the control bus 10, to a command input from the control bus 10 will be described with reference to FIG. 8.

When serial data is input from the control bus 10, the SCI reception-processing section B6 of the USB/control bus conversion software 23 controls the port setting section B4 to enable reception via the serial port 32. The serial data output from the control bus 10 is received in this state. Then, the SCI reception-processing section B6 creates a command frame based on the received data, and records the command frame in the control-bus command-frame reception buffer Bd5. If a control bus command frame is present in the control-bus command-frame reception buffer Bd5, the control-bus filtering section B3 obtains the control bus command frame and analyzes the command. If the command is determined by the analysis as a command to be responded with reference to a setting value recorded in the setting value buffer Bd2 described earlier, the control-bus filtering section B3 obtains the setting value recorded in the setting value buffer Bd2, creates a transmission control bus command frame, and writes the transmission control bus command frame to the control-bus command-frame transmission buffer Bd4. Furthermore, the control-bus filtering section B3 outputs a control bus command transmission request to the port setting section B4. Upon receiving the control bus command transmission request, the port setting section B4 enables serial transmission via the serial port 32.

While transmission by the serial port 32 is enabled, the SCI transmission-processing section B5 reads data from the control-bus command-frame transmission buffer Bd4, and the data is transmitted byte by byte from the serial port 32.

Thus, using the setting value written to the setting value buffer Bd2, command and status with a severe time constraint can be quickly responded without issuing inquiries to the notebook PC 3.

Next, examples of processing by the USB/control bus conversion software 23 will be described.

(1) Time Polling Processing

The USB/control bus conversion software 23 executes time polling processing for responding to commands transmitted at a regular interval (600 ms) for confirming status of an apparatus connected to the control bus 10, which corresponds to the time polling operation of the USB/control bus converter 14 described earlier.

Upon receiving a time polling command (command for confirming status) transmitted from the head unit 2 via the control bus 10, the SCI reception-processing section B6 creates a time polling command frame, and records the time polling command frame in the control-bus command-frame reception buffer Bd5.

Furthermore, the SCI reception-processing section B6 outputs an acknowledgement of reception of the transmission data (one byte) to the SCI transmission-processing section B5. The SCI transmission-processing section B5 transmits the acknowledgement of reception of the transmission data to the head unit 2 via the control bus 10.

The control-bus filtering section B3 obtains the time polling command frame from the control-bus command-frame reception buffer Bd5, analyzes the command, and obtains a setting value from the setting value buffer Bd2, thereby creating a response command status for time polling. The control-bus filtering section B3 records the response command status in the control-bus command-frame transmission buffer Bd4. The SCI transmission-processing section B5 transmits the response command status recorded in the control-bus command-frame transmission buffer Bd4 to the head unit 2 via the control bus 10.

When the acknowledgement of reception of transmission data or the response command status is transmitted to the head unit 2 as described above, a timing detecting section B8 (shown in FIG. 8) detects a timing at which output of a polling request is allowed, and the timing for outputting a polling request is output to the port setting section B4. Based on the timing for outputting a polling request, the port setting section B4 enables output of the acknowledgement of reception of transmission data, etc. via the serial port 32.

2) Audio Playing Processing

Audio playing processing is executed in the USB/control bus converter 14 when a user performs an operation for starting audio playing at the head unit 2 and a corresponding command is transmitted from the head unit 2 to the notebook PC 3. The audio playing processing is another example of the user-initiated operation described earlier.

Upon receiving a playing command transmitted from the head unit 2 via the control bus 10, the SCI reception-processing section B6 creates an audio playing command frame, and records the audio playing command frame in the control-bus command-frame reception buffer Bd5. Furthermore, the SCI reception-processing section B6 outputs an acknowledgement of reception of transmission data (one byte) to the SCI transmission-processing section B5. The control-bus filtering section B3 obtains the audio playing command frame from the control-bus command-frame reception buffer Bd5 and analyzes the command. Since the command is determined by the analysis as a command be transferred to the notebook PC 3, the control-bus filtering section B3 converts the audio playing command into a USB data frame, and records the USB data frame in the USB data-frame transmission buffer Bd6. The USB data frame relating to audio playing, recorded in the USB data-frame transmission buffer Bd6, is transferred to the notebook PC 3 by the USB transmission-processing section B7.

As described hereinabove, according to the embodiment of the present invention, the head unit 2 outputs a control bus command corresponding to an input operation by a user. The USB/control bus converter 14 of the conversion unit 5 converts the control bus command by writing it to a data portion of a USB data frame (packet) compliant with a interface standard different from that for the control bus command, and outputs the USB data frame to the notebook PC 3. In the notebook PC 3, the virtual CDC software 21 analyzes the input USB data frame to read the control bus command, and based on the control bus command, it reads and outputs music data stored in the hard disk drive. The music data is transmitted to the head unit 2 for playing by the car audio apparatus.

Thus, the notebook PC 3 can be controlled by an operation at the head unit 2 so as to play compressed audio data stored in the notebook PC 3 by the car audio apparatus. In this case, the compressed audio data is decoded in the notebook PC 3 and converted into analog data by the USB and DA converter 13 before being transmitted to the head unit 2. Accordingly, the car audio apparatus directly receives input of analog audio data, so that an LSI for decoding compressed audio data is not needed in the car audio apparatus. That is, the user is allowed to listen to music in the form of compressed audio data only by connecting the notebook PC 3 to an audio apparatus via the conversion unit 5. Thus, the user need not prepare audio apparatuses incorporating decoder LSIs for various situations of listening to music in the form of compressed audio data. Accordingly, total cost for the user is reduced, and environmental load is reduced.

Furthermore, since the user need not write music data in a large number of storage media for listening to the music in various situations, usability is improved.

Furthermore, according to the embodiment, a control bus command written to a data portion of a USB data frame is input to the notebook PC 3 via the USB cable 4, and music data in the USB format is output from the notebook PC 3 via the USB cable 4. Thus, the control bus command and the music data can be transmitted and received to and from the notebook PC 3 via the same input/output interface. Accordingly, the audio system 1 can be readily implemented using a computer interface such as a USB interface.

Furthermore, according to the embodiment, in the conversion unit 5, setting data set by the notebook PC 3 is stored in the setting value buffer, and if a predetermined command such as a time polling request command from the head unit 2 is included in a control bus command, the conversion unit 5 returns the setting data to the head unit 2. Accordingly, a response request from the head unit 2 with a severe time constraint can be responded quickly, so that the head unit 2 is allowed to operate as if an actual CD changer were connected.

That is, by connecting the notebook PC 3 to the head unit 2 via the audio cables 6 including the audio pin cables 9 and the control bus 10, the conversion unit 5, and the USB cable 4, the notebook PC 3 can be regarded as having the same functions as an actual CD changer.

The conversion unit 5 according to the embodiment, if carried into an automobile together with the notebook PC 3 and connected to the head unit 2, allows the notebook PC 3 to function as a CD changer, serving to reduce cost for the user and to improve usability.

Various modifications or alternatives to the embodiment described above are possible without departing from the spirit of the present invention. For example, although the notebook PC 3 and the conversion unit 5 are connected via the USB cable 4 in the embodiment described above, without limitation thereto, other types of bus, such as an IEEE 1394 bus, may be used. Furthermore, the notebook PC 3 and the conversion unit 5 may be linked by wireless, for example, based on Bluetooth or using a wireless LAN.

Furthermore, although the conversion unit 5 is a separate unit in the embodiment described above, without limitation thereto, the conversion unit 5 may be incorporated in the head unit 2 or in the notebook PC 3.

Furthermore, although music data is stored in the hard disk of the notebook PC 3 in the embodiment described above, music data may be stored in other types of internal storage units, or in an external storage medium such as a CD-R, an MD, or a memory card. Furthermore, instead of the notebook PC 3, other types of computer apparatus, such as a PDA (personal digital assistant) or a cellular phone, may be used.

Furthermore, although music data stored in the notebook PC 3 is played at the head unit 2 in the embodiment described above, without limitation thereto, the present invention may be applied to, for example, playing of video data stored in the notebook PC 3.

Furthermore, although a car audio apparatus is used as a data playing apparatus in the embodiment described above, an automobile navigation apparatus, or other types of audio apparatuses or audio/visual apparatuses may be used.

The features of the embodiment described above may be selected or modified as appropriate without departing from the spirit of the present invention.

What is claimed is:

1. A data playing system comprising:
playing means for generating a first control signal corresponding to operational inputs entered by a user, said playing means receiving media data and a second control signal, wherein said playing means plays said media data according to said second control signal;
computing means including storage means for storing said media data, said computing means operating to select, read, and transmit said media data using said first control signal, wherein said computing means transmits said media data along with said second control signal to appropriately process and play said media data on said playing means; and
conversion means coupled to said playing means and said computing means, said conversion means receiving, converting, and transmitting said first control signal in a first format compatible with said playing means into a second format compatible with said computing means, said conversion means also receiving, converting, and transmitting said second control signal and said media data in said second format compatible with said computing means into said first format compatible with said playing means.

2. A data playing system according to claim 1, wherein said conversion means includes
   a time polling means for polling said playing means for said first control signal at a fixed time interval.

3. A data playing system according to claim 1, wherein said second control signal controls operation of said playing means.

4. A data playing system comprising:
   a computer apparatus for selecting and outputting recorded playing data and a first control signal for processing and controlling said playing data;
   a playing apparatus including:
      an operation unit configured to enable a user to operate said playing apparatus, said operation unit generating an output signal corresponding to operational inputs entered by the user;
      a transmitter configured to generate a second control signal corresponding to said operational inputs; and
   an interface apparatus coupled to said computer apparatus and said playing apparatus, said interface apparatus operating to receive, convert, and transmit said playing data and said first and second control signals,
   wherein said computer apparatus uses said second control signal to select said playing data, and
   wherein said playing apparatus uses said first control signal to process and play said playing data on said playing apparatus.

5. A data playing system according to claim 4, wherein said recorded playing data includes audio data.

6. A data playing system according to claim 5, wherein said playing apparatus includes audio playing apparatus configured to play said audio data.

7. A bus conversion unit comprising:
   a hub coupled to a computing means through a first bus compliant with a first data format, said first bus configured to transport a second control signal to said computing means to select media data stored in the storage of said computing means, said first bus also configured to transport said media data and a first control signal used to process and control said media data from said computing means;
   a digital-to-analog converter coupled to a playing means and said hub, said digital-to-analog converter operating to convert said media data from said first data format into a second data format compatible with said playing means; and
   a bus converter coupled to said hub and to said playing means through a second bus compliant with said second data format, said second bus used to transport said first control signal from said playing means and to transport said second control signal to said playing means so that said media data can be played on said playing means according to said second control signal.

8. A bus conversion unit according to claim 7, wherein the first bus is a USB (Universal Serial Bus) cable and the first format is a USB data frame format.

9. A bus conversion unit according to claim 7, wherein said playing means is an audio apparatus and the second bus is a control bus of said audio apparatus.

10. A bus conversion unit comprising:
   a hub that can be connected to a first bus compliant with a predetermined standard;
   a digital-to-analog converter connected to the hub, for converting a digital signal input from the first bus to the hub into an analog signal; and
   a bus converter that is connected to the hub and that can be connected to a second bus compliant with a standard that is different from the standard for the first bus,
   wherein the bus converter converts a signal in a predetermined data frame format input from the first bus to the hub into a command in a predetermined format, and converts a signal input from the second bus as a command in the predetermined format into a signal in the predetermined data frame format, outputting the signal in the predetermined data frame format to the first bus,
   wherein the second bus is a control bus of an audio apparatus, and the predetermined command is transmitted via the control bus in the audio apparatus, and
   wherein the bus converter is connected to the audio apparatus via the control bus, and the bus converter outputs, on its own, a response command for polling to the audio apparatus in response to a request from the audio apparatus.

11. A data playing method comprising:
   generating and transmitting a first control signal corresponding to operational inputs entered by a user at a playing means;
   receiving, converting, and transmitting said first control signal in a first format compatible with said playing means into a second format compatible with a computing means;
   receiving said first control signal at said computing means;
   selecting, reading, and transmitting media data using said first control signal;
   generating a second control signal, at said computing means, to appropriately process and play said media data;
   transmitting said second control signal;
   receiving, converting, and transmitting said second control signal and said media data in a second format compatible with said computing means into said first format compatible with said playing means,
   receiving said media data and said second control signal at said playing means; and
   playing said media data according to said second control signal.

* * * * *